UNITED STATES PATENT OFFICE.

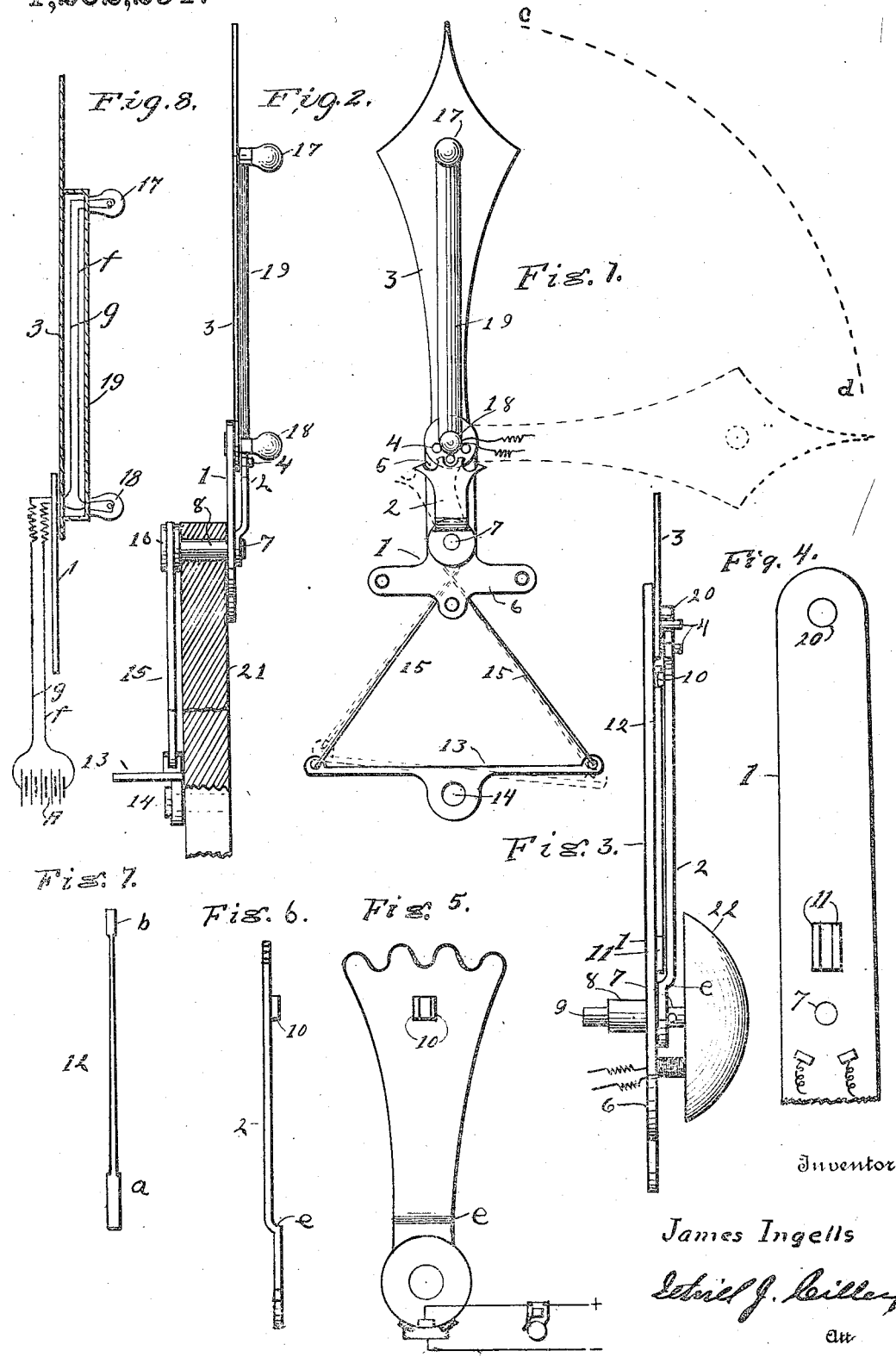

JAMES INGELLS, OF MUSKEGON, MICHIGAN.

DIRECTION-INDICATOR FOR AUTOMOBILES.

1,202,291.    Specification of Letters Patent.    Patented Oct. 24, 1916.

Application filed July 6, 1915. Serial No. 38,361.

*To all whom it may concern:*

Be it known that I, JAMES INGELLS, a citizen of the United States, residing at Muskegon, in the county of Muskegon and State of Michigan, have invented certain new and useful Improvements in Direction-Indicators for Automobiles, of which the following is a specification.

My invention relates to a new and useful appliance for designating what direction an automobile is to travel, and especially for the purpose of designating to a traffic officer, or crossing policeman in large cities, what direction an automobile is to travel upon the city streets so the proper directions may be obtained from the officer, and its objects are:—first, to avoid the danger of error on the part of the traffic officer; second, to avoid the necessity of taking the hand from the pilot wheel to motion the direction the automobile is to go, and, third, to indicate to an automobile close behind what direction the forward automobile is to travel, and especially if the forward automobile is to turn to the right or to the left, in the night time. I attain these objects by the mechanism and application of parts indicated in the accompanying drawing in which—

Figure 1 is a front elevation of the indicator and its supporting and actuating parts connected; Fig. 2 is an edge elevation of the same; Fig. 3 is an enlarged edge view of the supporting base and its several attachments with an alarm bell shown thereon; Fig. 4 is an elevation of the upper end of the base showing a device for supporting the actuating spring; Fig. 5 is an elevation of the actuating lever showing a device for receiving the upper end of the actuating spring; Fig. 6 is an edge elevation of the same, Fig. 7 is an edge elevation of the preferred form of actuating spring, and Fig. 8 is a transverse vertical section of the finger, in connection with an available form of threading the electric wires from a battery to energize the lights in the finger.

Similar characters refer to similar parts throughout the several views.

The lower end, 6, of the base is to be securely bolted to the dash-board 21, or other available part of the automobile in such a position that the index finger 3 will stand vertical when in its normal position. This position of the finger is to indicate that the automobile is to move directly ahead. This finger is pivotally connected to the upper end of the supporting base, as at 20, and is actuated to be thrown to the right or to the left, by means of an actuating arm 2. This arm is pivotally connected to the base upon the bearing 7 of the shaft 8, and is provided at its upper end with a series of teeth, as 5, that are arranged to engage the pins 4 on the lower end of the finger 3 so that when the upper end of the actuating arm is thrown to the right or to the left the upper end of the finger 3 is thrown to the right or the left in the opposite direction, as indicated by their dotted lines in Fig. 1.

The shaft 8 may be actuated by means of a pedal 13 which should be pivotally secured to some available part of the automobile, as the dash board 21, or other suitable element, as at 14. The shaft 8 is passed through the dash board on automobiles so constructed as to necessitate it, as indicated in Fig. 2, and has a wheel 16 secured upon the bearing 9 of the shaft so that when properly connected with the pedal, as with a strap, chain or other element as indicated at 15 in Figs. 1 and 2, the shaft 8 is made to make a part of a revolution when the pedal 13 is properly actuated and throw the finger 3 to one side or the other, as hereinbefore described.

That the index finger 3 may be made to stand normally in a vertical position it is necessary to actuate it to return to this position, when the pedal is relieved, and for this purpose I employ the use of a spring, as 12, having its lower end, *a*, passed between the bearings or lugs 11 on the base, and the upper end passed between the corresponding lugs 10 on the actuating arm, so that normally the actuating arm and the finger will both be held in the position shown in Fig. 1. I have shown the upper end of the spring 12, at *b*, made much thicker than the body of the spring so as to form a close and reliable connection between the lugs 10, on the actuating arm 2.

At 17 I have shown an electric bulb, preferably showing a green light, and at 18 I have shown another electric light bulb indicating a red light. The reason for this distinction is that no mistake may be made in the direction the automobile is to go, especially in the night time when the finger cannot be otherwise safely distinguished.

19 represents a casing to cover the electric wires that are connected with the bulbs.

At 22 I have indicated the position of an electric bell for sounding an alarm when it is desired to attract the attention of a traffic officer or other person without resorting to the sounding of the ordinary automobile horn. It is designed that the bell be so placed that it may be made to ring when the index finger 3 is passing between c and d, either to the right or to the left, but will not ring when the finger is in its normal vertical, or horizontal position.

When using the form of spring shown at 12 it is necessary to offset the actuating arm, as indicated at e, for the purpose, first, of carrying the upper end outside of the lower end of the finger 3, and second, of making room for the spring between the arm and the base, as shown in Fig. 3.

It will be readily understood that the description, delineation and manner of operating the device, herein covers but one of many forms for the successful application and operation of this device; hence I do not desire to restrict myself to this, or any other restricted form of construction, but do desire to cover the appliance as broadly as the state of the art will allow.

When used in the country to designate to following automobiles the direction the automobile carrying the indicator is to proceed, it is necessary to secure the indicator to the hind end of the automobile, but in this case the operation of the device is exactly the same as when connected with the front end of the automobile, but in this case the pilot lights on the finger are much more essential when being used in the night time, as it would be impossible to distinguish the position of the finger without the lights, and the lights should always be of the same colors. That is, the center lights on all automobiles should always be of one color, as bright red, and the light at the outer end of the finger should always be of the same color on all automobiles, as bright green, so the public will become so educated to the symbols that mistakes would be impossible.

In Fig. 8 f represents electric conducting wires from the battery A to the electric light bulbs 18—17 and g is the return wire to the battery A.

What I claim as new, and desire to secure by Letters Patent of the United States, is:—

1. In a direction indicator for automobiles, a standard secured to the body of the automobile, and having an opening through it, a shaft passing through said opening and having an actuating wheel on one end and an actuating arm on the other end, an index finger pivotally mounted on the upper end of the standard to stand, normally, in vertical position, means connected with the actuating arm and with the lower end of the finger to swing the finger over to the right or to the left to lie in horizontal position, and means for automatically carrying said finger back into vertical position.

2. In direction indicators for automobiles, a standard secured to the body of the automobile and having an opening therethrough, a shaft passing through said opening, an actuating wheel secured to one end of said shaft, an actuating arm secured to the other end of said shaft, an index finger pivotally secured at the upper end of the standard, to stand normally in vertical position, distinctive lighting appliances connected with the ends of said finger, means connected with the actuating arm and with the lower end of the finger for carrying the finger over to the right and to the left to lie in horizontal position, and means for carrying it back automatically into vertical position.

3. In a direction indicator for automobiles, a standard secured to the body of the automobile, and having an opening through it for a shaft bearing, a shaft revolubly mounted in said opening, an actuating arm secured on one end of said shaft, an actuating wheel secured on the other end of said shaft, an index finger pivotally mounted on the standard above the upper end of the actuating arm, the upper end of the actuating arm connected with the lower end of the index finger in such a manner as to hold the finger normally in vertical position, and to throw the finger over to the right and to the left to lie in horizontal position, distinctive light appliances mounted in the ends of the finger and a bell connected with the finger and arranged to be made to ring as the finger is carried over to the right or to the left, and means for carrying the finger back into vertical position when the direction has been properly indicated.

Signed at Grand Rapids Michigan July 1, 1915.

JAMES INGELLS.